United States Patent
Kuroiwa et al.

(10) Patent No.: US 8,904,054 B2
(45) Date of Patent: Dec. 2, 2014

(54) METHOD AND APPARATUS FOR MODE SWITCHING OF INTERFACE PORTS

(75) Inventors: Miyuki Kuroiwa, Temecula, CA (US); Kenny Kin Wah Lau, Temecula, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/425,248

(22) Filed: Mar. 20, 2012

(65) Prior Publication Data

US 2013/0254431 A1 Sep. 26, 2013

(51) Int. Cl.
 G06F 3/00 (2006.01)
 G06F 1/26 (2006.01)
 G06F 21/31 (2013.01)
 G06F 21/74 (2013.01)

(52) U.S. Cl.
 CPC *G06F 1/266* (2013.01); *G06F 3/00* (2013.01); *G06F 21/31* (2013.01); *G06F 21/74* (2013.01)
 USPC ............ 710/14; 710/62; 710/72; 713/100

(58) Field of Classification Search
 None
 See application file for complete search history.

(56) References Cited

U.S. PATENT DOCUMENTS

| | | | | | |
|---|---|---|---|---|---|
| 6,141,719 | A | * | 10/2000 | Rafferty et al. | 710/316 |
| 6,871,252 | B1 | * | 3/2005 | Cline | 710/313 |
| 7,043,587 | B2 | * | 5/2006 | Burke et al. | 710/302 |
| 7,694,032 | B2 | | 4/2010 | Lim et al. | 710/14 |
| 7,984,285 | B2 | | 7/2011 | Darmawan et al. | 713/2 |
| 8,478,979 | B2 | * | 7/2013 | Hodge | 713/100 |
| 8,621,195 | B2 | * | 12/2013 | Wang et al. | 713/2 |
| 2003/0056051 | A1 | * | 3/2003 | Burke et al. | 710/302 |
| 2005/0188142 | A1 | * | 8/2005 | Nakajima | 710/303 |
| 2010/0070659 | A1 | * | 3/2010 | Ma et al. | 710/14 |
| 2010/0082846 | A1 | * | 4/2010 | Kim et al. | 710/14 |
| 2010/0083366 | A1 | * | 4/2010 | Challener et al. | 726/17 |
| 2010/0275001 | A1 | * | 10/2010 | Yoshioka et al. | 713/2 |
| 2011/0016334 | A1 | * | 1/2011 | Tom et al. | 713/300 |
| 2012/0119696 | A1 | * | 5/2012 | Picard | 320/107 |
| 2012/0166173 | A1 | * | 6/2012 | Fischbach | 703/28 |
| 2012/0210146 | A1 | * | 8/2012 | Lai et al. | 713/310 |

OTHER PUBLICATIONS

'Battery Charging Specification' Revision 1.2, Dec. 7, 2012, pp. i,ii,1,3,14-22,36. Full document can be found at http://www.usb.org/developers/devclass_docs.*

* cited by examiner

*Primary Examiner* — Steven Snyder
(74) *Attorney, Agent, or Firm* — Moser Taboada

(57) ABSTRACT

A computer-implemented method for mode switching of an interface port comprising detecting a device coupled to a port of a computer, selecting to disable a data pin of the port if it is determined that an output of the device has a data pin and powering the device using a power pin of the port.

9 Claims, 3 Drawing Sheets

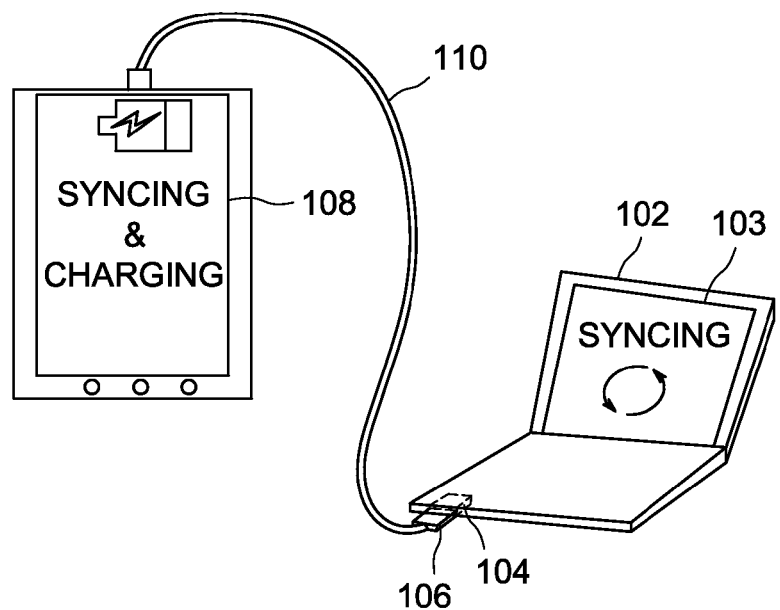
FIG. 1 (REFERENCE ART)
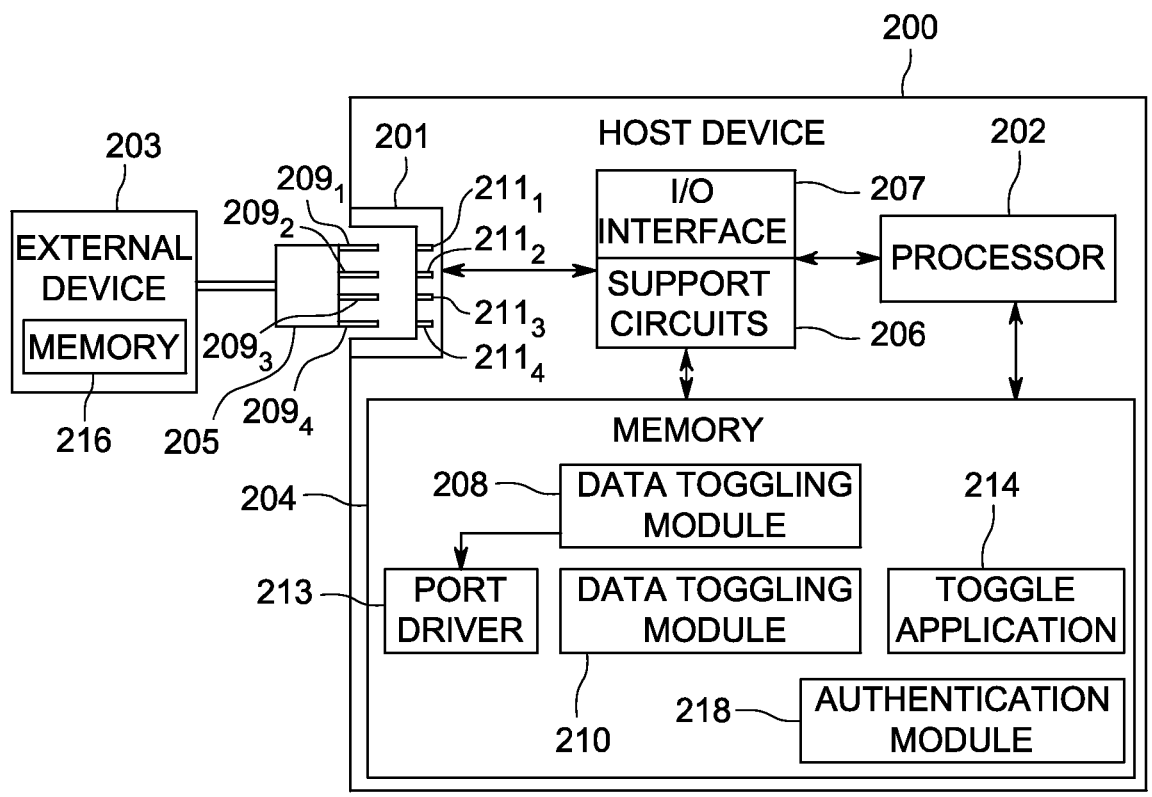
FIG. 2A

METHOD AND APPARATUS FOR MODE SWITCHING OF INTERFACE PORTS

BACKGROUND

1. Field of the Invention

Embodiments of the present invention generally relate to gesture detection and, more particularly, to a method and apparatus for mode switching of interface ports.

2. Description of the Related Art

Personal computers are generally equipped with multiple ports, such as Universal Serial Bus (USB), mini-USB, high speed serial bus (IEEE 1394—Firewire®) and the like for providing power and data transfer services to devices. Devices such as portable storage USB keys and input devices such as pressure sensitive drawing pads benefit from combined data/power lines since the combination eliminates a need for an extra power line to a wall outlet.

However, some portable and mobile devices have different modes when coupled with a USB port. Some devices have a USB wall charger mode where the device enter power charging mode and the internal memory (e.g., flash memory) of the device is inaccessible, but the device itself is usable. A device using USB PC port mode enters power charging mode allowing the internal memory to be accessible by the coupled computer as external storage. A problem exists where many computers whose ports are in USB PC port mode render a device coupled to the port unusable until the device is removed from the PC's port. Often users like to charge their device while also using the device as a portable music player (PMP), video player and/or video game player. However, the user's computer will lock the device into memory mode where the USB device is treated as external storage after detecting a data pin on the USB port. The user is unable to benefit from the intended purpose (i.e., listening to music, playing videos or video games, etc.) of the device while it is being charged by the computer when the interface port is functioning in USB PC port mode.

FIG. 1 is an illustration depicting a conventional connection between a notebook computer 102 and a portable device 108. Once the device 108 is connected to computer 102, the device 108 begins syncing data files and charging the battery of the device 108 as shown on display 103 and device 108. The device transmits and receives data through cable 110 coupled to the computer 102 using a connector 106. The connector 106 couples to the computer port 104. Once the computer 102 detects a connected device with data syncing abilities, the computer 102 automatically engages the device 108 by powering and syncing the device 108, making the device 108 function as an external memory source. The device 108 is unable to perform its intended function, which may be, in exemplary embodiments, streaming music and videos and running video games and the like, until decoupled from port 104.

Therefore, there exists a need to provide a method and apparatus for mode switching of interface ports while in USB PC port mode so that a user may use the device for its intended purpose while charging the device through the port.

SUMMARY OF THE INVENTION

Embodiments of the present disclosure generally include a method for mode switching of an interface port comprising detecting a device coupled to a port of a computer, selecting to disable a data pin of the port if it is determined that an output of the device has a data pin and powering the device using a power pin of the port.

Embodiments of the present disclosure generally include an apparatus comprising apparatus for mode switching of an interface port comprising a port driver for detecting a device connected to the port and a data pin disabler for disabling a data pin of the port if it is determined that the device output has a data pin and powering the device using a power pin of the port.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1 is an illustration depicting a conventional connection between a notebook computer and a portable device;

FIG. 2A is a functional block diagram of a computer system in accordance with exemplary embodiments of the present invention;

DETAILED DESCRIPTION

Figure 2B:
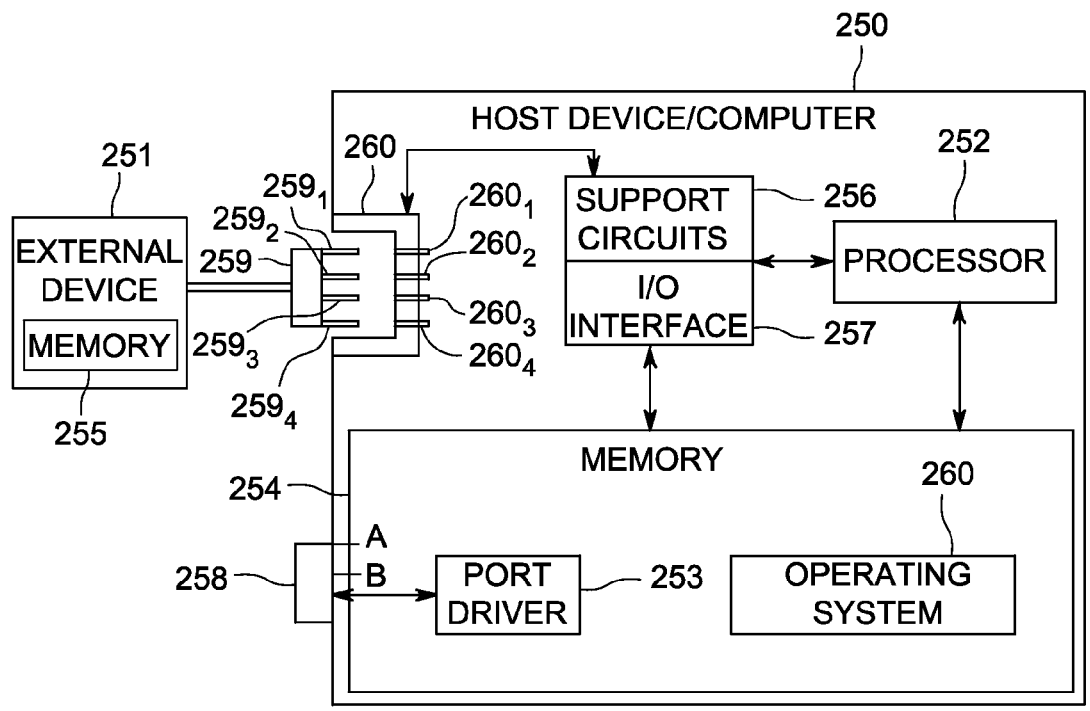
FIG. 2B is a functional block diagram of a computer system in accordance with other embodiments of the present invention.

As explained further below, various embodiments of the invention disclose a method and apparatus for functional switching of interface ports. In one embodiment, a computer with an input port such as a USB input port detects a data enabled device coupled to the port. If a user of the computer has enabled data usage through the port, the computer will automatically attempt to perform synchronization of the data between the computer and the data enabled device. If the user of the computer has disabled data through the port, the data pin of the USB port will be rendered disabled, and the computer will not make an attempt to synchronize any data, but will only power the device so that the user may continue to use the device for its intended purpose.

FIG. 2A is a functional block diagram of a host device/computer 200 in accordance with exemplary embodiments of the present invention. The computer system 200 includes a processor 202, a memory 204 and various support circuits 206. The processor 202 may include one or more microprocessors known in the art, and/or dedicated function processors such as field programmable gate arrays programmed to perform dedicated processing functions. The support circuits 206 for the processor 202 include microcontrollers, application specific integrated circuits (ASIC), cache, power supplies, clock circuits, data registers, input/output (I/O) interface 207, and the like. The I/O interface 207 may be directly coupled to the memory 204 or coupled through the supporting circuits 206. The I/O interface 207 may also be configured for communication with input devices and/or output devices, such as, network devices, various storage devices, mouse, keyboard, displays, sensors and the like. In an exemplary embodiment, the I/O interface is coupled to an IO port such as a USB port 201.

The memory 204 stores non-transient processor-executable instructions and/or data that may be executed by and/or used by the processor 202. These processor-executable instructions may comprise firmware, software, and the like, or some combination thereof. Modules having processor-executable instructions that are stored in the memory 204 comprise the data toggling module 208, the touchpad driver 213, the toggle data application 214, the authentication module 218. The computer system 200 may be programmed with one or more operating systems (generally referred to as operating system (OS) 210), which may include OS/2, Java Virtual Machine, Linux, Solaris, Unix, HPUX, AIX, Windows, Windows95, Windows98, Windows NT, and Windows2000, WindowsME, WindowsXP, Windows Server, among other known platforms. At least a portion of the operating system 210 may be disposed in the memory 204. In an exemplary embodiment, the memory 204 may include one or more of the following: random access memory, read only memory, magneto-resistive read/write memory, optical read/write memory, cache memory, magnetic read/write memory, and the like, as well as signal-bearing media, not including non-transitory signals such as carrier waves and the like.

According to one embodiment of the present invention, the data toggling module 208 controls the port 201, acting as a data pin disabler, through software visible via a display coupled to I/O interface 207. The data toggling module 208 interacts with a port driver 213 for controlling the USB port's communication with the Operating System 210. If a user wants to enter no-data mode for device 203, the user accesses a software module toggle application 214, stored in memory 204. In an exemplary embodiment, the toggle application 214 has a simple dialog box indicating data pin enablement/disablement of a plurality of ports. The toggle application 214 runs in the background as a service in Operating System 210, or is launched by the user of the system 200 as a software application. The toggle application 214 is coupled to the data toggling module 208 that transmits a signal the driver 213 to disable or enable the data pin $211_4$ of port 201. Once the port driver 213 has disabled the data pin $211_4$ of port 201, the device 203 will not sync with the computer system 200, but the power pins $211_{1...3}$ and $209_{1...3}$ remain functional. The device 203 is then charged using the power pins and is also usable as a music player, video player, e-book reader and the like without any syncing interruption. In this mode, the memory 216 of device 203 is not accessible by the computer system 200.

FIG. 2B is a functional block diagram of a host device/computer 250 in accordance with another embodiment of the present invention. The computer system 250 includes a processor 252, a memory 254 and various support circuits 256. The processor 252 may include one or more microprocessors known in the art, and/or dedicated function processors such as field programmable gate arrays programmed to perform dedicated processing functions. The support circuits 256 for the processor 252 include microcontrollers, application specific integrated circuits (ASIC), cache, power supplies, clock circuits, data registers, input/output (I/O) interface 257, and the like. The I/O interface 257 may be directly coupled to the memory 254 or coupled through the supporting circuits 256. The I/O interface 257 may also be configured for communication with input devices and/or output devices, such as, network devices, various storage devices, mouse, keyboard, displays, sensors and the like. In an exemplary embodiment, the I/O interface is coupled to an IO port such as a USB port 260.

The memory 254 stores non-transient processor-executable instructions and/or data that may be executed by and/or used by the processor 252. These processor-executable instructions may comprise firmware, software, and the like, or some combination thereof. Modules having processor-executable instructions that are stored in the memory 254 comprise the port driver 253. The computer system 250 may be programmed with one or more operating systems (generally referred to as operating system (OS) 260), which may include OS/2, Java Virtual Machine, Linux, Solaris, Unix, HPUX, AIX, Windows, Windows95, Windows98, Windows NT, and Windows 2000, Windows ME, Windows XP, Windows Server, among other known platforms. At least a portion of the operating system 260 may be disposed in the memory 254. In an exemplary embodiment, the memory 254 may include one or more of the following: random access memory, read only memory, magneto-resistive read/write memory, optical read/write memory, cache memory, magnetic read/write memory, and the like, as well as signal-bearing media, not including non-transitory signals such as carrier waves and the like.

According to another embodiment of the present invention, the functional switch 258, acting as a data pin disabler, of the computer system 250 alone controls the port 260 and enables and disables data syncing on the port 260 by controlling the pins of port 260. The port 260 provides power and data connections through an output coupler 259 of an external device 251. Computer 250 includes port 260 with pins $260_{1...4}$. These pins pins $260_{1...4}$ respectively interface with the external device 251 through coupler 259 comprising pins $259_{1...4}$. According to an exemplary embodiment, pins $259_{1...3}$ and $260_{1...3}$ are power pins and pins $259_4$ and $260_4$ are data pins. The device 251 charges its battery through the power pins $259_{1...3}$ and syncs data through pin $259_4$. The switch 258, when toggled to position A, enables the data pin $260_4$ to communicate and detect the data pin $259_4$ and to allow the computer 250 to sync data between the memory 255 of the device 251 and the memory 254 of the computer system 250. In position B, the switch 258 disables the functionality of the data pin $260_4$, ignoring all data syncing attempts, thereby signaling to both the device 251 and the computer 250 that no data connection is available and, consequently, that no syncing will be performed.

Figure 3:
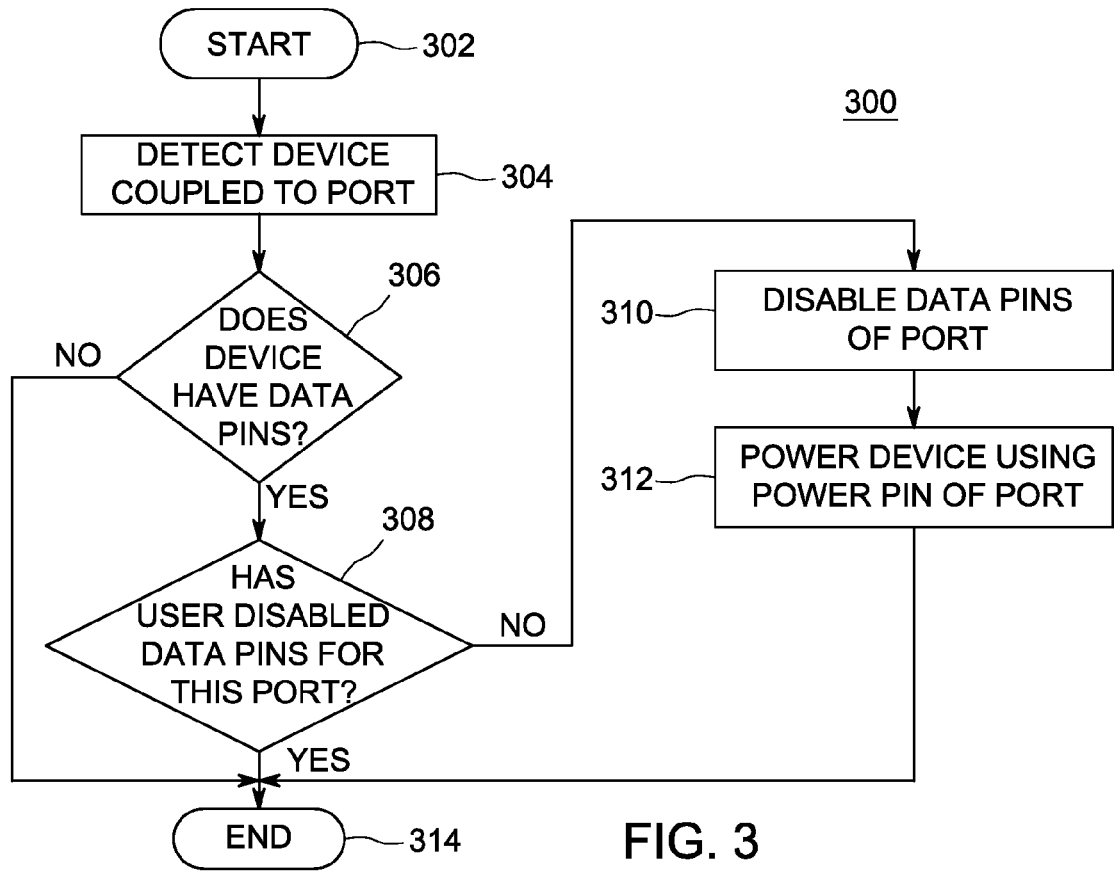
FIG. 3 is a flow diagram of a method for disabling data transfer in accordance with embodiments of the present invention.

FIG. 3 is a flow diagram of a method 300 for disabling data transfer in accordance with an embodiment of the present invention. The method 300 is an exemplary implementation of the data toggling module 208 as executed by the processor 202. The method begins at step 302 and proceeds to step 304. At step 304, the touchpad driver 213 detects a device coupled to a port on the system 200. The method then proceeds to step 306 to determine whether the device has one or more data pins. If the device has one or more data pins, the method proceeds to step 308. If the device does not have data pins as determined at step 306, the method ends at step 312. At step 308, the method 300 determines whether the user has selected to disable the data pins for this port through the data toggling module 208. In another embodiment, as discussed above, the user may also select to disable the data pins for the port using switch 258. If it is determined that the user has selecting to disable the data pins using switch 258, the data pins of the port are disabled at step 308 by the port driver 253. If the user has not requested to disable data pins on the port, the method ends at step 312. At step 310, once the data pins are disabled, the data toggling module 208 commands the port driver 213 to communicate with the Operating System 210 to provide power to the detected device. The method then ends at step 312.

Figure 4:
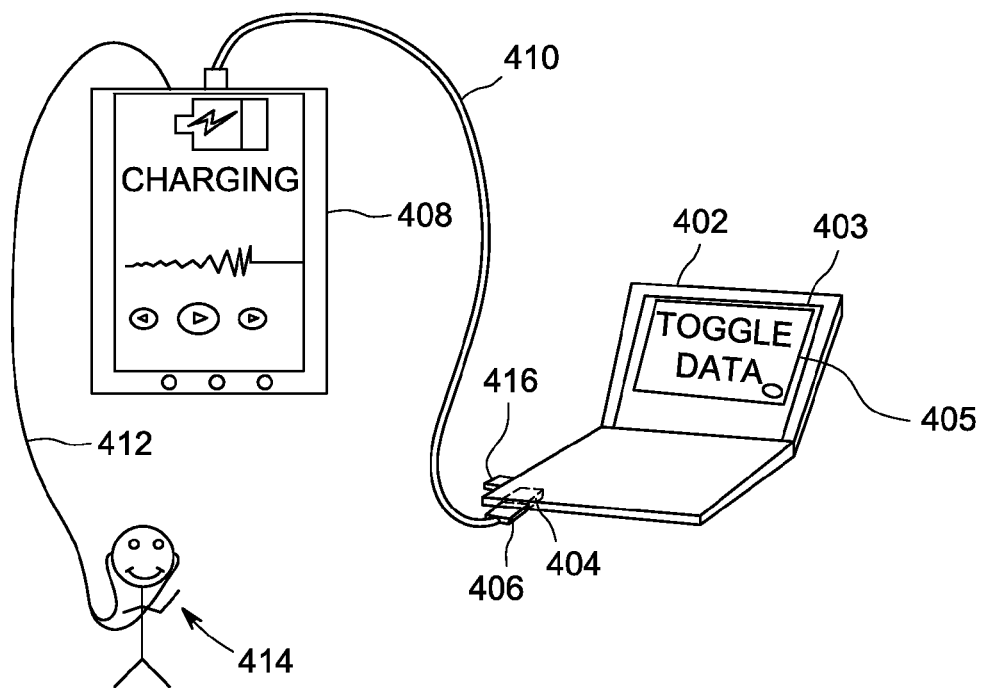
FIG. 4 is an illustration of a user using the toggle application in accordance with embodiments of the present invention.

FIG. 4 is an illustration of a user using the toggle application 214 in accordance with embodiments of the present invention. A user 414 is using device 408. The user previously used the computer 402 to launch the toggle data application 405 on display 403. The toggle data application 405 allows the user to select to disable the data pins on the port 404 of computer 402. When the battery of device 408 is depleted, the user 414 plus the device into port 404 using cable 410 with end coupler 406. The coupler 406 has a data pin, but since the user has selected to disable the data pin of 404, no data will be transmitted over the data pin on coupler 406. The user 414 may listen to music through audio cables 412 while the device 408 is being charged through power/data cable 410. The data connection through 410 is disabled, thus the computer cannot access any of the memory of device 408 when the user has disabled data through the toggle data application 405. In another embodiment, a switch 416 allows the user 414 to select to disable or enable the data pins of port 404 and a user may toggle the physical switch 416 either before, during or after coupling the device 408 to notebook 402, depending on the desired mode of usage.

According to the above discussion, all ports in a computer such as notebook computer 402 may have multiple functional states with respect to the current power mode of the computer. There are several power modes to consider such as G0/S0, G1/(S1-S4) and G2/S5. The G0/S0 state is a working state, wherein a user can use the computer to launch applications such as browsing the web and the like. G1/(S1 -S4) are sleeping states of the computer. In S1 sleep state, all processor caches are flushed, and the CPU(s) stop executing instructions. Power to the CPU(s) and random access memory (RAM) is maintained; devices that do not indicate they must remain on may be powered down. In S2 sleep state, the CPU is powered off. S3 state is commonly referred to as Standby, Sleep, or Suspend to RAM. The RAM remains powered. S4 sleep state is when the computer is in hibernation or suspend to Disk. All content of main memory is saved to non-volatile memory such as a hard drive, and is powered down. G2/S5 is referred to as a "Soft Off." G2 is similar to a "Mechanical Off" state, but some components remain powered so the computer can "wake" from input from the keyboard, clock, modem, LAN, or USB device.

Accordingly the present invention allows the ports on the computer to operate in the following states: "Power Enabled+ Data Enabled"—while the PC is in its G0/S0 'working' state. "Power Enabled+Data Disabled"—while the PC is in its G0/S0 'working' state. "Power Enabled"—while the PC is in its G1 (S1 through S4) 'sleeping' states. "Power Enabled"— while the PC is in a G2 (S5) 'soft off' state.

Figure 5:
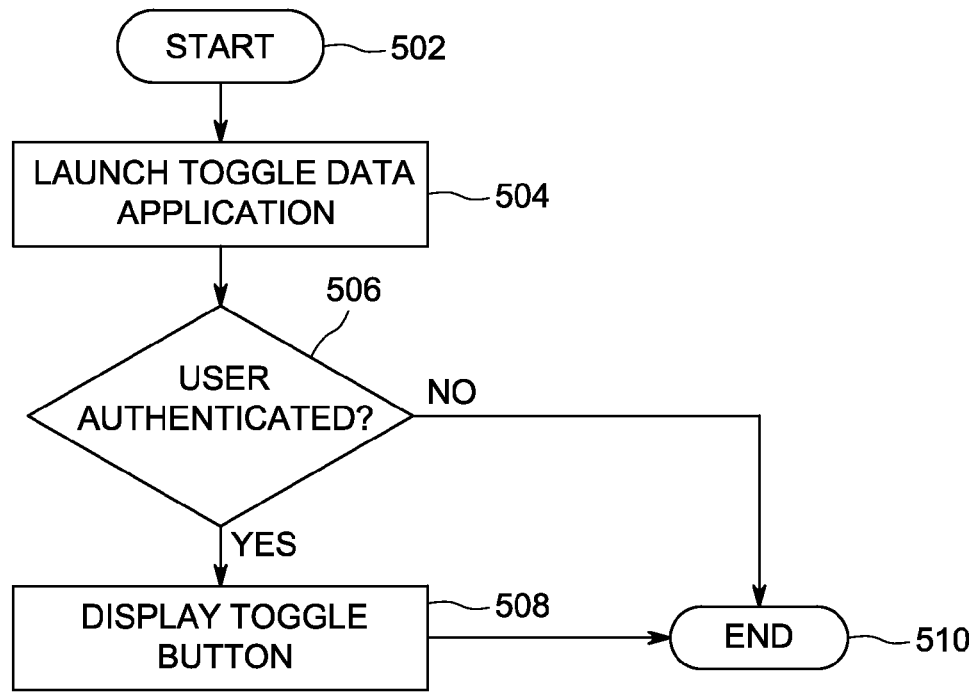
FIG. 5 is a flow diagram depicting a method 500 for authenticating a user in accordance with embodiments of the present invention.

FIG. 5 is a flow diagram depicting a method 500 for authenticating a user in accordance with embodiments of the present invention. Added security is given to the user when data toggling module 208 is used in conjunction with the toggle data application 214 by implementing a protection scheme in the toggle data application 214. The authentication is handled by the authentication module 218 which stores a particular passphrase or password to determine if the user is the correct user of the computer system 200. This prevents an unauthorized user from using someone else's personal device and connecting it to the user's computer to extract or corrupt the data. The method 500 is an implementation of the authentication module 218. The method begins at step 502 and proceeds to step 504. At step 504, a user launches the toggle data application 214. At step 506, the authentication module 218 determines if the credentials entered are correct according to a preconfigured user. If the credentials are correct, the method moves to step 508, where the toggle data pin button is displayed. If the credentials are incorrect, the method ends at step 510.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

While the foregoing is directed to embodiments of the present invention, other and further embodiments of the invention may be devised without departing from the basic scope thereof, and the scope thereof is determined by the claims that follow.

The invention claimed is:

1. A computer-implemented method for mode switching of an interface port of a host device comprising:
   detecting a device coupled to a port of a host device;
   receiving user input, via a user input interface displayed on the host device, indicating a user's preference for using the device in mass storage mode or no-data mode;
   selecting to disable a data pin of the port if the user prefers the no-data mode and powering the device using one or more power pins of the port, ignoring all data syncing attempts, wherein the user determines whether the data pin of the port is disabled or enabled by storing the user preference in memory of the host device; and
   otherwise, selecting to enable the data pin of the port and using the device in mass storage mode,
   wherein a party performing the selecting is authenticated upon detecting the device.

2. The method of claim 1 wherein the port of the host device is a universal serial bus (USB) port.

3. The method of claim 1 further comprising:
   disabling a plurality of data pins of the port of the host device if it is determined that an output of the device has a plurality of data pins.

4. The method of claim 1 wherein the port is a high speed serial bus port.

5. An apparatus for mode switching of an interface port of a host device comprising:
   a port driver for detecting a device connected to the port of the host device;
   a data toggle module, coupled to the port driver, for receiving user input displayed on the host device, via a user input interface, indicating if the user prefers using the device in mass storage mode or no-data mode;
   a data pin disabler for (1) disabling a data pin of the port if the user prefers the no-data mode while powering the device using one or more power pins of the port, ignoring all data syncing attempts, or (2) enabling the data pin of the port if the user prefers using the device in mass storage mode; and
   an authentication module coupled to the data pin disabler for authenticating a user of the apparatus attempting to disable the data pin of the port of the host device.

6. The apparatus of claim 5 wherein the data pin disabler is a switch for disabling the data pin of the port of the host device.

7. The apparatus of claim 5 wherein the port is a universal serial bus (USB) port.

8. The apparatus of claim 5 wherein the port is a high speed serial bus port.

9. The apparatus of claim 5 wherein the data pin disabler is a data-toggling module for disabling the data pin of the port.

* * * * *